Patented Aug. 29, 1933

1,924,507

UNITED STATES PATENT OFFICE 1,924,507

METHOD AND COMPOUND FOR REPELLING INSECTS

Alfred Markowsky, Woodbridge, N. J.

No Drawing. Application October 6, 1927
Serial No. 224,522

1 Claim. (Cl. 167—30)

My invention relates to a mixture or compound for repelling and killing insects such as moths, more particularly the clothes moth, and to render innocuous and harmless its secretions, deposits and larvæ, as also those of other insects, injurious to furs and wearing apparel generally, and to do this in a perfectly convenient, simple and reliable manner, while at the same time protecting the articles treated in accordance with my invention from fresh incursions of moths or the like during the near future.

It is an object of this invention to produce an insecticidal and repellent composition which is of a volatile nature, the evaporation of which is controlled to a large extent, one that is readily and safely handled and applied, that has an odor relatively inoffensive and usually rather pleasant to human senses, and one that will not deliquesce in summer heat and thereby leave an undesired mark or stain upon delicate fabrics. By the expression "summer heat" is meant temperatures in shaded localities or indoors from 80° F. to 100° or thereabouts.

It is not intended to limit this invention to any particular substances or to the number of them which may be compounded or associated, as this applicant has reason to believe other materials than those hereinafter set forth may be found by simple trial, which will accomplish in a certain inferior degree the objects of this invention. The following is given as the result of a number of years of experiment and research and as the preferred mixture and materials comprising this invention.

The substances discovered by me to be most satisfactory are paradichlorbenzene and paranitrochlorbenzene.

The melting point of the substance first named is 53° C., and of the second substance 83° C. All the mixtures will withstand practically 56° C. Paranitrochlorbenzene and paradichlorbenzene mixed in the proportions 20:80, 40:60, 50:50, 60:40, get greasy at 61° C., becoming quite undesirable. A mixture of 80% paranitrochlorbenzene and 20% paradichlorbenzene holds good to 69° C.

I have found that in all mixtures of these two substances the evaporation of the more volatile paradichlorbenzene, which has the lower boiling point and melting point, is retarded by the presence of the other substance, and this retardation is of such amount as to maintain the desired protective effect for a considerable length of time, quite long enough to carry the protection through the heated period of an ordinary summer season. The mixtures are found to evaporate without residue, marks or stains of any description being left upon the most delicate fabrics, and any remaining odor, and which is not in itself unpleasant, may be quickly dispelled by airing the garments in the usual manner. A distinct advantage found in using the substances named is that they are not expensive.

The mixture is applied to the garments in granular form, or in small bodies or balls, in cakes, or in suitable containers placed in trunks, chests or closets and wardrobes.

Having now described this invention and the manner of its use, I claim:—

A mixture for the protection of garments from moths and the like consisting of paradichlorbenzene and paranitrochlorbenzene, the said substances being proportioned one to the other whereby the mixture contains at least 20% of paranitrochlorbenzene will not soften sufficiently to smear garments at degrees of excessive summer heat up to 100° F.

ALFRED MARKOWSKY.